United States Patent [19]
Imamura et al.

[11] Patent Number: 4,876,953
[45] Date of Patent: Oct. 31, 1989

[54] SIPHON COFFEE MAKER

[75] Inventors: Humihiro Imamura, Seto; Tomio Hotta, Kuwana, both of Japan

[73] Assignee: Kabushiki Kaisha Toshiba, Kawasaki, Japan

[21] Appl. No.: 333,199

[22] Filed: Apr. 5, 1989

[30] Foreign Application Priority Data

May 30, 1988 [JP] Japan .................. 63-133593
May 30, 1988 [JP] Japan .................. 63-133594

[51] Int. Cl.4 .................. A47J 31/42; A47J 31/12
[52] U.S. Cl. .................. 99/280; 99/286; 99/292
[58] Field of Search .................. 99/279, 280, 281, 282, 99/283, 285, 286, 287, 289 R, 292, 299; 426/433

[56] References Cited

U.S. PATENT DOCUMENTS

4,566,802 1/1986 Koehler .................. 99/281
4,721,034 1/1988 Shimomura .................. 99/280
4,742,767 5/1988 Komatsu .................. 99/280
4,762,055 8/1988 Shimomura .................. 99/280

Primary Examiner—Robert W. Jenkins
Attorney, Agent, or Firm—Foley & Lardner, Schwartz, Jeffery, Schwaab, Mack, Blumenthal & Evans

[57] ABSTRACT

A siphon coffee maker includes a lower container for containing water, an electric heater for applying heat to the lower container, an upper container disposed on the lower container and having a water feed tube communicating to the interior of the lower container, a storage for storing data of an amount of coffee to be extracted, and a microcomputer-based control unit. The control unit operates to energize the heater in response to an extracting operation command, thereby starting an extracting operation. The control unit then operates to energize the heater after completion of the extracting operation by supplying the heater with an electrical output in proportion to the temperature of the amount of coffee to be extracted, data of which is stored in the storage.

9 Claims, 8 Drawing Sheets

SIPHON COFFEE MAKER

BACKGROUND OF THE INVENTION

This invention relates to a siphon coffee maker for extracting coffee by making use of the siphon phenomenon.

Siphon coffee makers provided with a control unit incorporating a microcomputer for automatic extracting and warmth retaining operations are well known. Such a siphon coffee maker comprises a lower container employed for containing water and heated by an electric heater such as a sheathed heater, an upper container employed for containing coffee powder and communicated to the interior of the lower container through a water feed tube, and a control unit for executing a series of operations by energizing and deenergizing the sheathed heater. More specifically, when a start switch is manually operated with the upper and lower containers filled with a desirable amount of coffee powder and the corresponding amount of water respectively, an extracting operation command is supplied to the control unit, which operates to energize the heater. Heat is applied to the lower container and the water contained therein is heated and boiled. The hot water is fed from the lower container to the upper container through the water feed tube owing to well known siphon phenomenon, thereby extracting coffee. When the heater is deenergized, the extracted coffee in the upper container is fed to the lower container through the water feed tube and reserved therein. Subsequently, the heater is reenergized so that a warmth retaining operation is performed for extracted coffee reserved in the lower container.

In performing the above-mentioned warmth retaining operation, the heater is generally needed to be controlled so as to be energized and deenergized in accordance with degree of temperature increase of the lower container. However, the heater is disposed in the vicinity of the lower container in the siphon coffee maker and the heater of a relatively large output type is employed for the reason that the water is needed to be boiled in a short period. Accordingly, it is difficult to accurately detect the temperature of the lower container during the warmth retaining operation. In view of the problem, the prior art siphon coffee maker has not been provided with a function of detecting the temperature of the lower container and instead, it is contemplated that the heater is controlled so as to be intermittently energized at predetermined intervals during the warmth retaining operation.

However, since a constant electrical output is supplied to the heater during the warmth retaining operation in the conventional construction of the siphon coffee maker, coffee in the lower container is likely to be excessively heated in the case that a small amount of coffee is reserved in the lower container, whereby the coffee is caused to be reboiled or the flavor of coffee is degraded. While, when a large amount of coffee is reserved in the lower container, heat is likely to be absorbed into the circumference, which results in a disadvantage that a sufficient warmth retaining does not take place even though heat is applied to the lower container by the heater.

Further, since the lower container is subjected to the ambient heat as well as heat generated by the heater when the room temperature is high, coffee in the lower container is likely to be overheated or the flavor thereof is degraded. Additionally, when the room temperature is relatively low, heat of coffee in the lower container is likely be absorbed into the circumference, also resulting in a disadvantage that a sufficient warmth retaining does not take place even though heat is applied to the lower container by the heater.

SUMMARY OF THE INVENTION

Therefore, a primary object of the present invention is to provide a siphon coffee maker wherein warmth of the extracted coffee can be retained at a suitable temperature, irrespective of the amount of coffee.

A second object of the invention is to provide a siphon coffee maker wherein warmth of the extracted coffee can be retained at a suitable temperature, irrespective of the room temperature.

In order to achieve the primary object, the siphon coffee maker of the invention comprises a lower container for containing water, a heater for applying heat to the lower container, an upper container disposed on the lower container and provided with a water feed tube communicating to the interior of the lower container, storage means for storing data of an amount of coffee to be extracted, and control means for controlling extracting and warmth retaining operations. The control means operates to energize the heater in response to an extracting operation command, thereby starting the extracting operation. After completion of the extracting operation, the control unit operates to energize the heater by supplying thereto an electrical output varied in proportion to the amount of coffee to be extracted, the data of which is stored in the storage means.

According to the above-described siphon coffee maker, coffee extracted in the upper container is fed to the lower container and subsequently, heat is applied to the lower container by the heater to retain the warmth of coffee. Since the electrical output supplied to the heater is varied in proportion to the amount of coffee to be extracted, heat is generated by the heater in accordance with the amount of coffee to be extracted. Accordingly, the warmth of coffee may be always retained at a suitable temperature, irrespective of the amount of coffee to be extracted.

It is desirable that the above-described siphon coffee maker be provided with a volume selecting switch for selectively setting the amount of coffee to be extracted depending on the number of cups. Accordingly, the amount of coffee can be set depending on the number of persons who will have coffee, providing for much convenience.

It is further desirable that the above-described siphon coffee maker be provided with a timer which is adapted to start timing a set period from the time of deenergization of the heater and that the control means operate to determine that the extracting operation is completed, when the timing operation of the timer starts. Thus, the completion of the extracting operation may be detected by way of the time control, which renders the controlling operation simple.

Further, the time period set in the above-described timer may be varied in accordance with the number of cups set with the volume selecting switch. This arrangement provides accurate determination for the completion of the extracting operation in accordance with the amount of coffee to be extracted.

Further, it is desirable that the control means operate to vary output of the heater by way of intermittently energizing the heater during the warmth retaining operation and that the energization duty ratio of the heater be changed in accordance with data of amount of coffee to be extracted stored in the storage means. As a result, output control of the heater may be simplified.

It is further desirable that detecting means be provided for detecting detachment of the lower container from the disposing position. When the control means operates to determine that the lower container has been detached, based on operation of the detecting means during the warmth retaining operation, the electrical output supplied to the heater may be varied to the minimum. As a result, even when part of coffee is drunk and accordingly, the amount of coffee reserved in the lower container is reduced during the warmth retaining operation, the heater is energized by supplying thereto the minimum electrical output, thereby preventing the reduced amount of coffee from being excessively heated and re-boiled.

In order to achieve the second object, the siphon coffee maker comprises a lower container for containing water, a heater for applying heat to the lower container, an upper container disposed on the lower container and provided with a water feed tube communicating to the interior of the lower container, a temperature sensor provided so as to be brought into contact with the upper container, temperature data storing means for storing data of the temperature of the upper container sensed by the temperature sensor before the starting of the extracting operation, and control means. The control means operates to energize the heater in response to an extracting operation command, thereby starting the extracting operation. Subsequently, the control means operates to deenergize the heater when the temperature of the upper container sensed by the temperature sensor is increased to a predetermined value, thereby completing the extracting operation. After completion of the extracting operation, the control means operates to supply the heater with electrical output varied in inverse proportion to the temperature of the upper container, the data of which is stored in the temperature data storing means.

According to the above-described siphon coffee maker, the electrical output supplied to the heater is varied in inverse proportion to the room temperature during the warmth retaining operation for the coffee reserved in the lower container. As a result, a calorific power of the heater is varied in accordance with the room temperature, thereby retaining coffee at a suitable temperature.

The control means may operate to prevent the starting of the warmth retaining operation in the period during which the temperature of the upper container sensed by the temperature sensor is maintained at a predetermined value or above after completion of the extracting operation. Consequently, the warmth retaining operation does not start immediately after completion of the extracting operation, whereby coffee the temperature of which is high may be prevented from being immediately heated. As a result, the coffee may be prevented from being re-boiled.

Other and further objects of the present invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

A first embodiment of the present invention will now be described with reference to FIGS. 1 to 5 of the accompanying drawings. Referring first to FIG. 2, a housing 1 is formed into a generally L-shaped configuration. The housing 1 includes a lower base portion 2, in the upper surface of which an electric heater 3 such as a sheathed heater is provided. The right-hand side of the housing 1 is utilized for a case for enclosing electrical and electronic parts, as viewed in FIG. 2. A mill motor 5 for milling coffee beans is provided in the interior of the housing 1 over the case 4. A mill case 6 is detachably attached to the housing 1 over the mill motor 5. A cutter 7 for milling the coffee beans is disposed on the inner bottom of the mill case 6. The cutter 7 is coupled to a rotational shaft of the mill motor 5 through a coupling member 8 in the condition that the mill case 7 is attached to the housing 1. A filter 9 is mounted on a part of the peripheral wall of the mill case 6. A guide portion 10 communicates to the mill case 6 through the filter 9. A container holder 11 extends upward from the left-hand side of the base portion 2 and is detachably mounted on the housing 1. A holding member 12 is provided on one distal end of the container holder 11 so as to be positioned over the heater 3. A lower container 13 is formed of heat-proof glass and into a flask shape with the bottom rounded. The lower container 13 is held in position at the upper end neck portion thereof by the holding member 12. An upper container 14 is also formed of heat-proof glass. A filter (not shown) is provided on the bottom of the upper container 14. A water feed tube 15 extends downward from the filter. The upper container 14 is placed on the lower container 13 with packing member 16 interposed therebetween. When the upper container 14 is disposed in position, the lower end of the water feed tube 15 is positioned in the vicinity of the inner bottom of the lower container 13. An upper cover 17 is provided for covering the upper container 14 and mill case 6. Reference numeral 18 designates a cover switch.

A temperature sensor 19 is mounted on the case 4 and urged by a compression coil spring 20 so as to be projected obliquely upward from the central left-hand side wall of the case 4, as viewed in FIG. 2. A container detecting switch 38 is also mounted on the case 4 and urged by another compression coil spring 39 so as to be projected obliquely upward from the central left-hand side wall of the case 4. Each of the temperature sensor 19 and container detecting switch 38 is brought into contact with the outer surface of the upper container 4 in the condition that the upper container 14 is disposed on the lower container 13.

Figure 3:
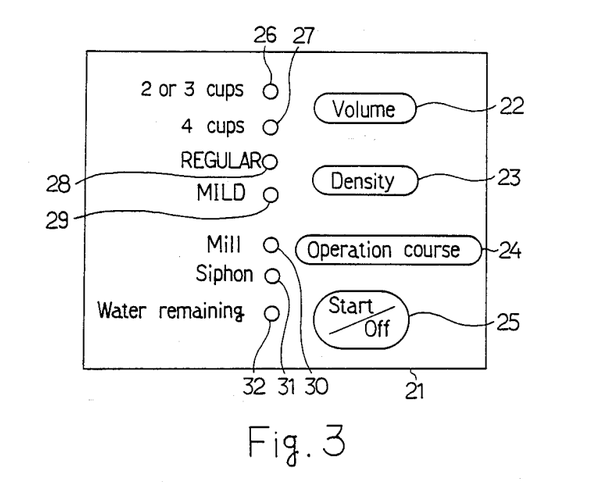
FIG. 3 is a front view of an operation panel employed in the siphon coffee maker.
Figure 4:
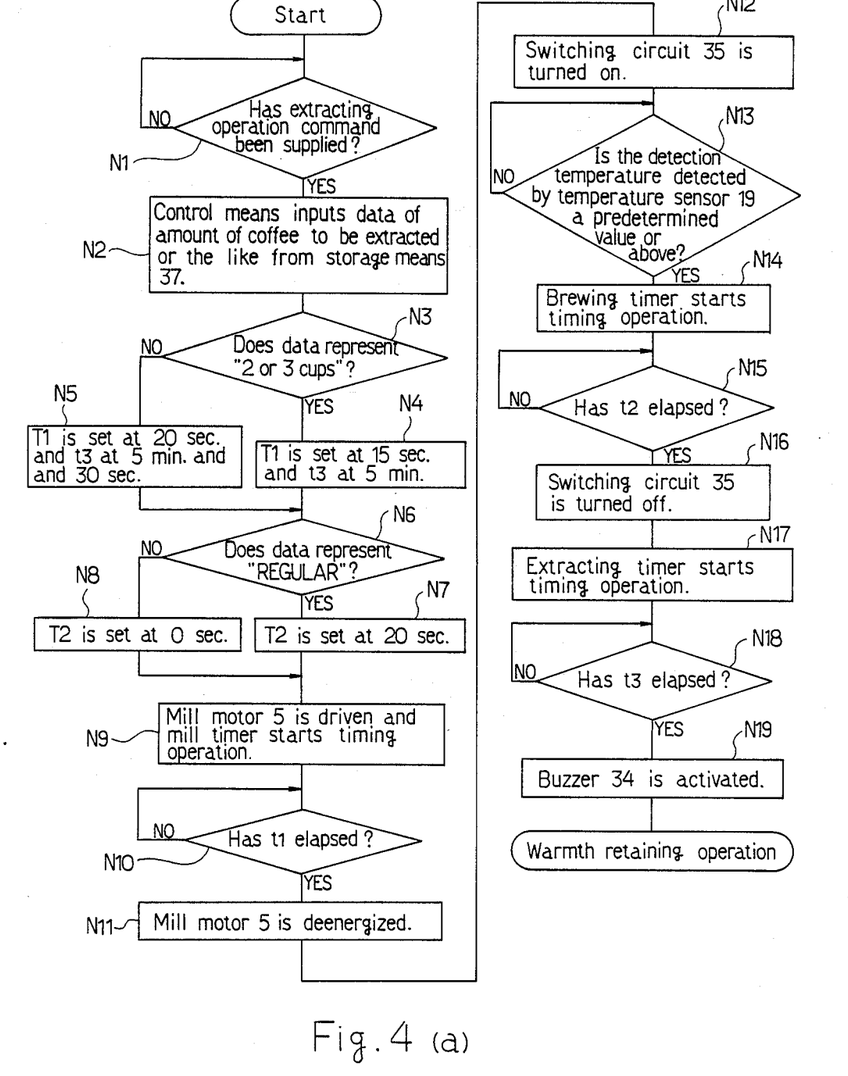
FIGS. 4(a) and 4(b) are flowcharts explaining the controlling operation of the control means incorporated in the siphon coffee maker.
Figure 5:
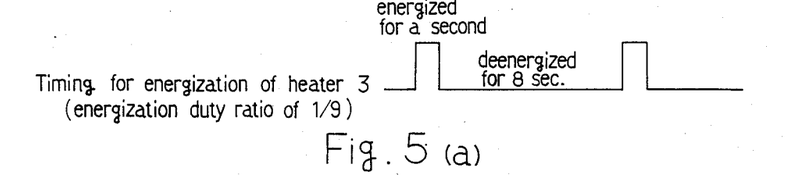
FIGS. 5(a) and 5(b) are time charts illustrating the manner of energizing the heater.

An operation panel 21 is provided on the front side of the case 4. On the operation panel 21 are provided a volume selecting switch 22, density selecting switch 23, operation course selecting switch 24, start switch 25, and light-emitting diodes 26–32, as shown in FIG. 3.

Figure 1:
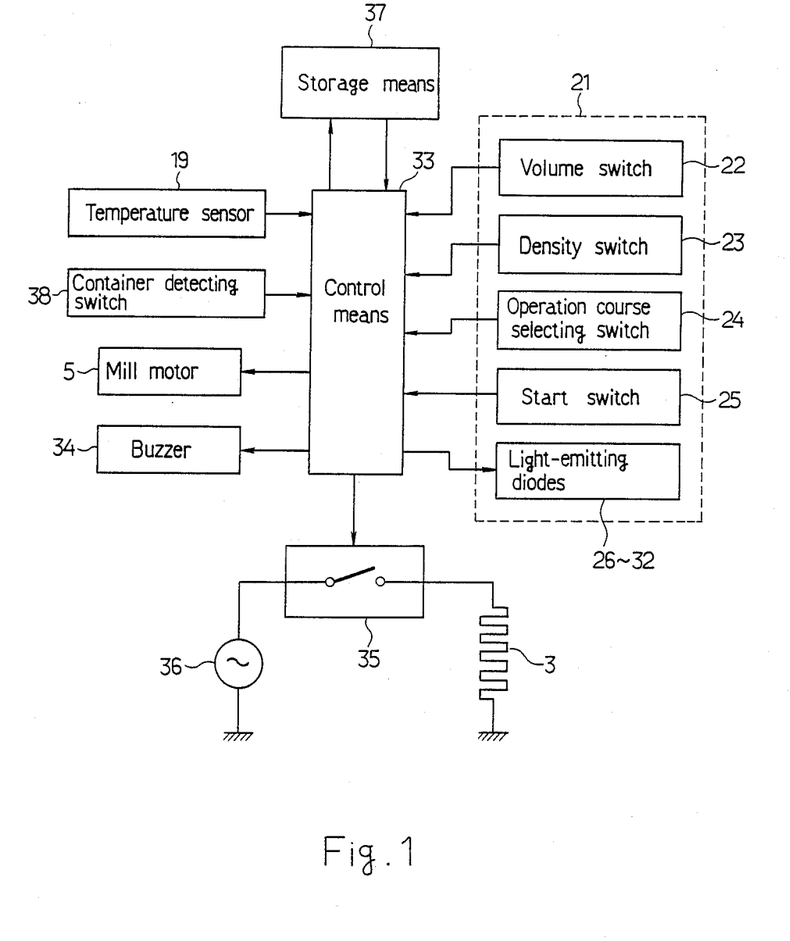
FIG. 1 is a block diagram illustrating electrical arrangement of the siphon coffee maker of a first embodiment in accordance with the invention.
Figure 2:
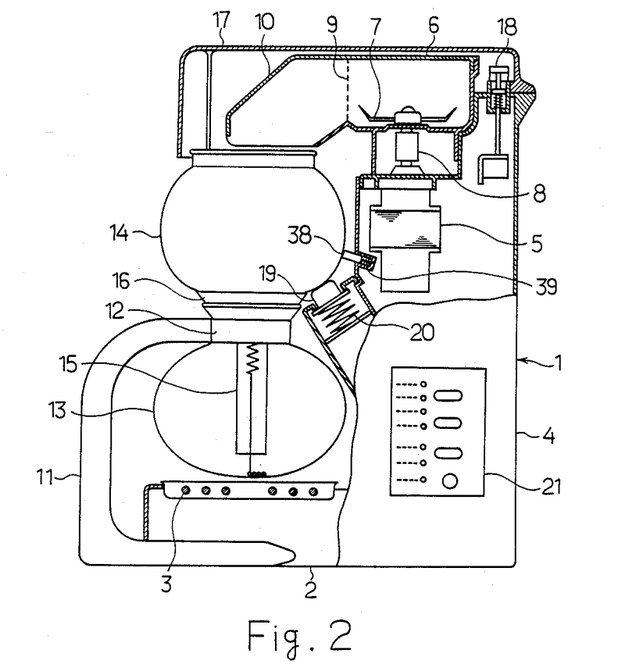
FIG. 2 is longitudinal sectional view of the siphon coffee maker.

Referring now to FIG. 1 illustrating the electrical arrangement of the siphon coffee maker, microcomputer-based control means 33 is adapted to receive a volume command from the volume selecting switch 22, a density command from the density selecting switch 23, an operation course command from the operation course selecting switch 24, a start command from the start switch 25, data of the temperature sensed by the temperature sensor 19, and a detection signal from the container detecting switch 38. The control means 33 further controls turn-on of each of the light-emitting diodes 26–32 and the driving of the mill motor 5. A buzzer 34 provided in the case 4 is activated by the control means 33. A switching circuit 35 is turned on and off in response to commands from the control means 33, thereby selectively connecting the heater 3 to a commercial AC power source. Storage means 37 comprises a semiconductor memory unit, for example. Digital data supplied from the control means 33 is stored in the storage means 37. In response to a command from the control means 33, the storage means 37 supplies the digital data stored therein to the control means 33.

Operation of the siphon coffee maker will now be described with reference, particularly, to FIGS. 4(a) and 4(b) illustrating controlling manner of the control means 33. A desired amount of coffee beans is put into the mill case 6 and the corresponding amount of water is poured into the lower container 13. The volume switch 22 is then manually operated to selectively set the amount of coffee in accordance with the amount of coffee beans. More specifically, the light-emitting diode 26 indicating the amount of two or three cups of coffee is activated in the initial state. When the volume switch 22 is depressed once in the initial state, the light-emitting diode 26 is deactivated and instead, the light-emitting diode 27 indicating the amount of four cups of coffee is activated. Thus, the light-emitting diodes 26 and 27 are alternately activated every time the volume switch 22 is depressed once. The control means 33 determines the amount of coffee to be extracted based on either of the light-emitting diodes 26, 27 activated. Then, the density selecting switch 23 is operated so that a desirable density of coffee is set. The light-emitting diode 28 indicating the regular coffee is activated in the initial state. When the density selecting switch 23 is depressed once in the initial state, the light-emitting diode 28 is deactivated and instead, the light-emitting diode 29 indicating the mild coffee is activated. The light-emitting diodes 28 and 29 are alternately activated every time the density selecting switch 23 is depressed. The control means 33 determines the density of coffee to be extracted based on either of the light-emitting diodes 28, 29 activated. The operation course selecting switch 24 is then operated so that a desirable operation course is selected. The light-emitting diode 30 indicating the mill operation is activated in the initial state. When the operation course selecting switch 24 is depressed once in the initial state, the light-emitting diode 30 is deactivated and instead, the light-emitting diode 31 indicating the siphon operation is activated. When the operation course selecting switch 24 is further depressed once, the light-emitting diode 31 is deactivated and the light-emitting diode 34 indicating the warmth retaining operation is then activated. The light-emitting diodes 30 to 31 are activated in sequence every time the operation course selecting switch 24 is depressed. The siphon coffee maker is thus operated in accordance with each of three operation courses: one starting from the mill operation, another starting from the extracting operation, and the other starting from the warmth retaining operation. The control means 33 determines the operation course based on any one of the light-emitting diodes 30–31 activated. The control means 33 operates to store data of number of cups, coffee density, and operation course selected as described above. In the embodiment, data of the number of cups stored in the storage means 37 corresponds to the information of the amount of coffee to be extracted and accordingly, the storage means 37 is also employed as storage means for storing data of the amount of coffee to be extracted.

The start switch 25 is operated after each of the switches 22 to 24 is depressed at a desirable number of times so that the initial state is set. In the embodiment, the mill operation course is selected so that the siphon coffee maker starts with the mill operation. Upon operation of the start switch 25, the start command or extracting operation command is supplied to the control means 33. The control means 33 operates to determine whether or not the extracting operation command is inputted at operation step N1 in FIG. 4(a). When the extracting operation command has been inputted, the control means 3 operates to input data of the amount of coffee to be extracted and coffee density from the storage means 37 at step N2. The control means 33 determines the amount of coffee to be extracted based on data of the amount of coffee at step N3. When the light-emitting diode 26 indicating "2 or 3 cups" is activated, the control means 33 operates to set the operating period t1 of the mill timer at 15 seconds and a standby period t3 of the extraction timer at 5 minutes at step N4. When the light-emitting diode 27 indicating "4 cups" is activated, the control means 33 operates at step N5 to set the period t1 at 20 seconds and the period t3 at 5 minutes and 30 seconds. The control means 33 further determines the coffee density from data inputted thereto from the storage means 37 at step N6. When "Regular" is selected, the control means operates to set the brewing period t2 of a brewing timer at step N7. When "Mild" is selected, the control means 33 operates to set the period t2 at 0 sec. at step N8. The mill motor 5 is driven for set period t1 at steps N9 through N11 so that the coffee beans in the mill case 6 are milled by the cutter 7 into coffee powder. The coffee powder is blown through the filter 9 and falls into the upper container 14 through the guide member 10. The switching circuit 35 is turned on at step N12, thereby connecting the heater 3 to the commercial AC power source 36. Heat generated by the heater 3 is applied to the lower container 13 containing water. When the water in the lower container 13 is boiled, the siphon phenomenon causes the hot water to rise into the upper container 14 through the water feed tube 15, as well known in the art. The hot water and coffee powder are mixed in the upper container 14, thereby extracting coffee. When the temperature of the upper container 14 sensed by the temperature sensor 19 is increased to a predetermined value after the hot water is supplied to the upper container 14 at step N13, the brewing timer is operated at step N14. The control means 33 is on standby for the brewing period t2. When the brewing period t2 elapses at step N15, the switching circuit 35 is turned off at step N16, thereby deenergizing the heater 3. As the atmospheric temperature of the lower container 13 is decreased, coffee in the upper container is caused to fall down into the lower container 14. The extracting timer is operated at step N17. It takes a maximum of five minutes for the amount of coffee corresponding to two or three cups to fall down from the upper container 14 into the lower container 13. It also takes a maximum of five minutes and thirty seconds for the amount of coffee corresponding to four cups to fall down into the lower container 13. The control means 33 is on standby for the maximum period at step N18. The buzzer 34 is activated after elapse of the maximum standby period at step N19, thereby informing an operator of completion of the extracting operation.

Subsequently, the control means 33 operates to execute a warmth retaining operation. At step N20, the control means 33 operates to determine the number of cups based on data of the amount of coffee to be extracted inputted thereto at step N2. When the data presents "2 or 3 cups," the switching circuit 35 is reiteratively turned on for one second and off for the subsequent eight seconds. Consequently, the heater 3 is intermittently energized at the duty ratio of 1/9, that is, the heater 3 is reiteratively energized for one second and deenergized for the subsequent eight seconds, as shown in FIG. 5(a). Accordingly, even when the amount of coffee contained in the lower container 13 is relatively small as corresponding to two or three cups, coffee in the lower container 13 is heated at a small calorific power as the output of the heater 3 is rendered relatively small. Warmth of the coffee in the lower container 13 is retained at a suitable temperature. Whereas, when the data inputted to the control means 33 at step N2 represents "4 cups," the control means 33 operates to determine whether or not a container detecting flag represents the logical value of "1" at step N22. The control means 33 determines that the container detecting flag does not represent the logical value of "1." Then, since the upper container 14 is disposed on the lower container 14 and takes a predetermined position at step N24, the switching circuit 35 is reiteratively turned on for two seconds and off for the subsequent eight seconds, whereby the heater 3 is energized in the duty ratio of 1/5, that is, the heater 3 is reiteratively energized for two seconds and deenergized for the subsequent eight seconds, as shown in FIG. 5(b). Accordingly, the output of the heater 3 is rendered relatively large. Consequently, even when the amount of coffee in the lower container 13 is relatively large as corresponding to 4 cups, the coffee is heated at a large calorific power as the heater output is rendered large and accordingly, warmth of the coffee in the lower container 13 is retained at the suitable temperature.

Where the operator detaches the lower container 13 by removing the container holder 11 from the housing 1 for the purpose of having coffee in the lower container 13, the upper container 14 is brought out of contact with the container detecting switch 38, which detects the detaching of the upper container 14. The control means 33 determines that the upper container 14 has been detached, at step N23. The container detecting flag is set at the logical value of "1." The control means 33 determines at step N20 that the number of cups is four and at step N22 that the container detecting flag represents the logical value of "1," whereby the switching circuit 35 is reiteratively turned on for a second and off for the subsequent eight seconds. The heater output is rendered the minimum in the warmth retaining operation. More specifically, when the lower container 14 containing coffee is removed from the housing 1 during the warmth retaining operation, the output of the heater 3 is restrained to the value as in the case of two or three cups even though "4 cups" is previously set. Accordingly, even where the operator detaches the lower container 13 to have coffee therein during the warmth retaining operation and the amount of coffee in the lower container 13 is reduced, the warmth retaining operation is continued with the heater output decreased when the lower container 13 is re-attached to the housing 1, thereby preventing the reduced amount of coffee from being heated excessively.

According to the above-described embodiment, since the heater 3 is energized with the electrical output varied in proportion to the coffee amount represented by the data stored in the storage means 37 during the warmth retaining operation, the calorific power of the heater 3 is varied in accordance with the amount of extracted coffee. Consequently, the warmth of coffee in the lower container 13 may be retained at a suitable temperature irrespective of the amount thereof.

Further, since data of the amount of coffee to be extracted is determined based on the driving period of the mill motor 5, means for detecting the amount of extracted coffee may not be newly provided, thereby simplifying the construction of the siphon coffee maker.

Since output of the heater 3 is varied so as to be the minimum when the detachment of the upper container 14 is detected by the container detecting switch 38 during the warmth retaining operation, the calorific power of the heater 3 may be restrained even if the amount of coffee is reduced. Accordingly, the coffee in the lower container 13 may be prevented from being excessively heated. As a result, coffee may be prevented from being re-boiled and flavor of coffee may be prevented from being degraded owing to excessive heating.

Although data of the amount of coffee to be extracted depends on the driving period of the mill motor 5 in the foregoing embodiment, means for setting the amount of coffee may be provided instead and the amount of coffee set by the means may be made use of as the data of amount of extracted coffee. Alternatively, measuring means for directly measuring the amount of extracted coffee may provided and information supplied from the measuring means may be utilized as the data of amount of extracted coffee.

Although the heater output is varied during the warmth retaining operation by changing the energization duty ratio of the heater 3 in the case of intermittent energization of the heater 3 in the foregoing embodiment, the heater output may be varied by so-called phase control instead.

Figure 6:
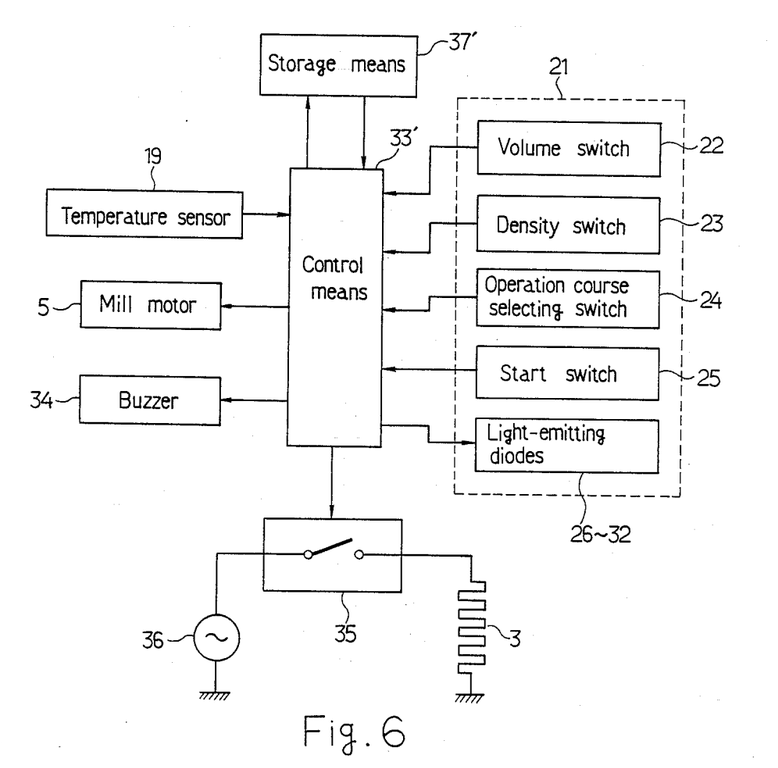
FIG. 6 is a view similar to FIG. 1 illustrating the siphon coffee maker of a second embodiment.
Figure 7:
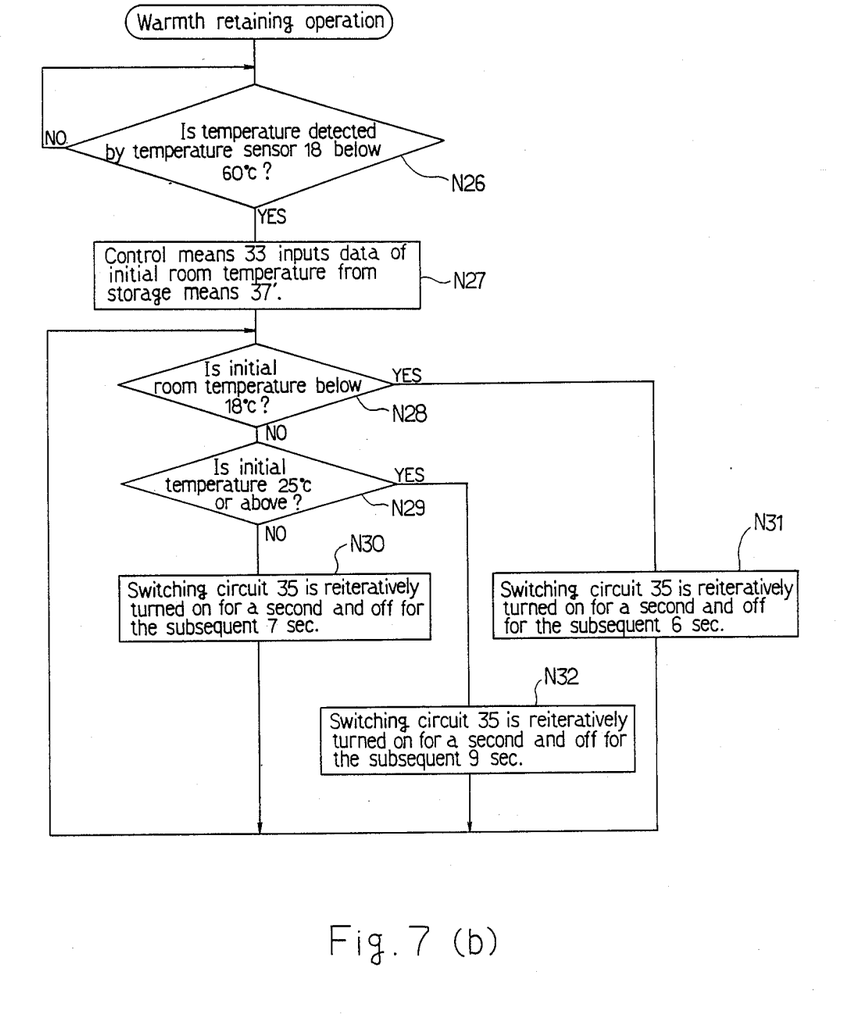
FIGS. 7(a) and 7(b) are views similar to respective FIGS. 4(a) and 4(b) explaining the controlling operation of the control means incorporated in the siphon coffee maker of the second embodiment.
Figure 7A:
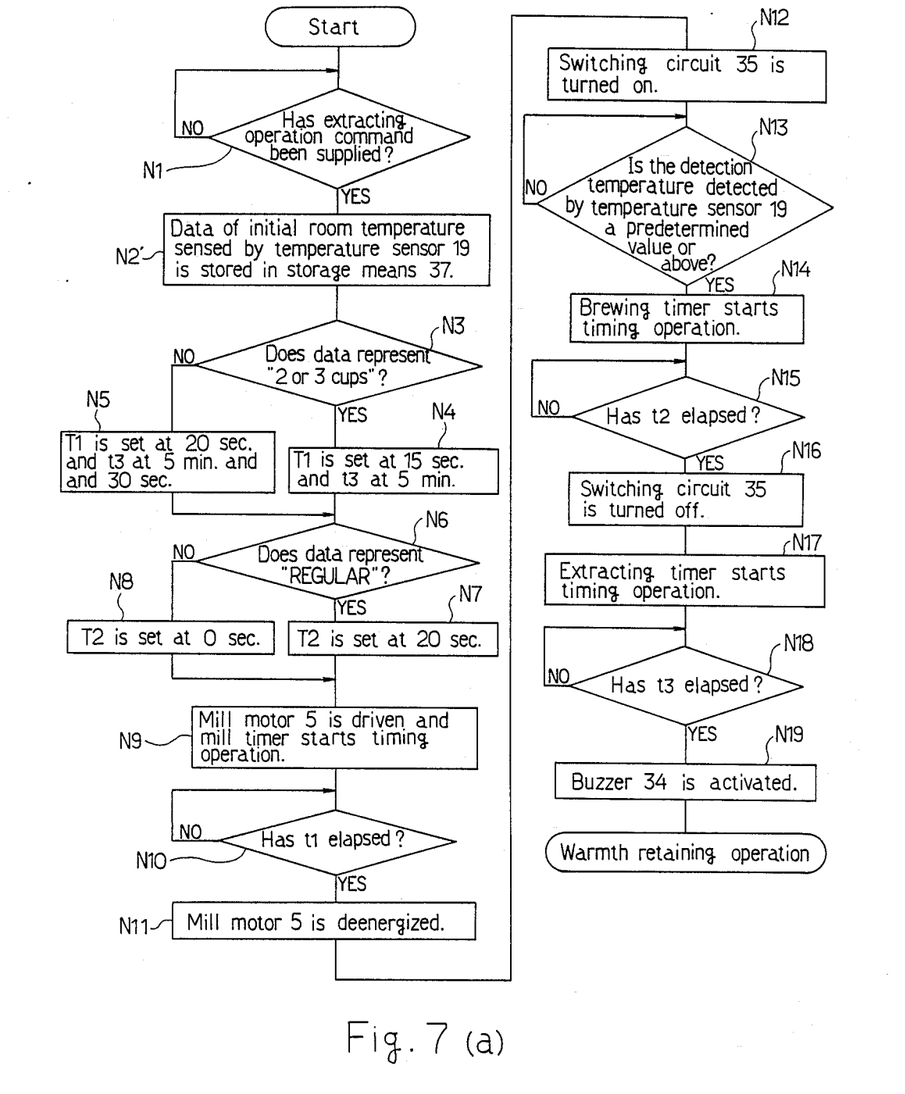
Figure 8:
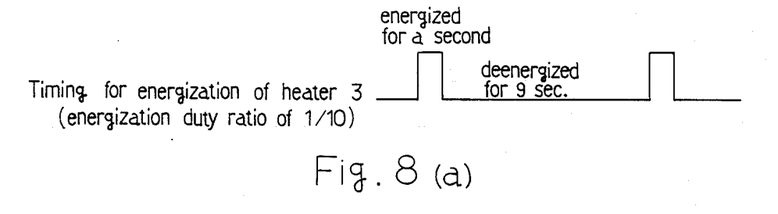
FIGS. 8(a) and 8(b) are views similar to FIGS. 5(a) and 5(b) illustrating the manner of energizing the heater in the siphon coffee maker of the second embodiment.

FIGS. 6 to 8 illustrate a second embodiment. Similar reference numerals are labeled to the same parts as in the foregoing embodiment. Differences of the second embodiment from the first embodiment will be described. The control means 33' performs operation control in the same manner as that of the control means 33 except manners in step N2' in FIG. 7(a) and in the flowchart of FIG. 7(b). The storage means 37' is adapted to perform the same operation as that of the storage means 37 except write and storing operations at step N2' in FIG. 7(b). The storage means 37' also serves as temperature data storing means.

At step N2', the temperature of the upper container sensed by the temperature sensor 19 is stored in the storage means 37 as digital data of the room temperature. Otherwise the extracting operation is executed under of control of the control means in the same manner as in the foregoing embodiment.

Subsequently, the control means 33' executes the warmth retaining operation. The control means 33' is on standby until the temperature of the upper container 14 sensed by the temperature sensor 19 is decreased to the value below 60° C. at step N26. More specifically, the control means 33' operates to restrain execution of the warmth retaining operation in the period for which the temperature of the upper container 14 sensed by the temperature sensor 19 takes the value of 60° C. or more. Accordingly, the remaining heat is applied to the lower container 13 in this period so that the warmth of coffee is retained. When the temperature of the upper container sensed by the temperature sensor 19 is decreased below the value of 60° C., the control means 37' operates, at step N27, to input data of the initial value of the room temperature stored in the storage means 37' at step N2'. When the initial room temperature is in the range between 18° C. and 25° C., the switching circuit 35 is reiteratively turned on for a second and off for seven seconds at step N30. As a result, the heater 3 is intermittently energized in the duty ratio of 1/8, that is, the heater 3 is reiteratively energized for a second and deenergized for the subsequent seven seconds, as shown in FIG. 8(b). Since a constant output is supplied to the heater 3 to thereby generate heat, coffee in the lower container 13 is retained at a suitable temperature. When the initial room temperature, data of which is stored in the storage means 37', takes the value below 18° C., the switching circuit 35 is reiteratively turned on for a second and off for the subsequent six seconds, whereby the heater 3 is reiteratively energized in the duty ratio of 1/7, that is, the heater 3 is reiteratively energized for a second and deenergized for the subsequent six seconds, as shown in FIG. 8(c). As a result, the input to the heater 3 is higher than in the case where the initial room temperature is in the range between 18° C. and 25° C. Even if coffee in the lower container 13 is cooled during the warmth retaining operation owing to the ambient temperature below 18° C., a large calorific power of heat is applied to the lower container 13 since the heater output is rendered large. The coffee in the lower container 13 is thus retained at a suitable temperature. When the initial room temperature sensed by the temperature sensor 19, data of which is stored in the storage means 37', takes the value of 25° C. or above, the switching circuit 35 is reiteratively turned on for a second and off for the subsequent nine seconds, whereby the heater 3 is energized in the duty ratio of 1/10, that is, the heater 3 is reiteratively energized for a second and deenergized for the subsequent nine seconds, as shown in FIG. 8(a). Consequently, a low level input is supplied to the heater 3 as compared in the case of the initial room temperature ranging between 18° C. and 25° C. Even if the temperature of coffee in the lower container is likely to be increased owing to high ambient temperature, a small calorific power of heat is applied to the lower container 13 containing coffee and accordingly, coffee is retained at a suitable temperature.

According to the siphon coffee maker of the second embodiment, the heater 3 is intermittently energized in the warmth retaining operation and the energization duty ratio of the heater 3 is varied in accordance with data of the initial room temperature stored in the storage means 37' The energizing duty ratio is increased when the initial room temperature is high. The energizing duty ratio is decreased when the initial room temperature is low. The heater output is varied by changing the heater input in inverse proportion to the room temperature. Consequently, coffee contained in the lower container 13 is not influenced by the room temperature and retained at a suitable temperature.

Since the temperature sensor 19 provided for detecting hot water supplied condition of the upper container 14 is utilized as the sensor for sensing the room temperature, an exclusive sensor means for sensing the room temperature is not needed, thereby simplifying the construction of the siphon coffee maker.

Since the heater 3 is first intermittently energized for the warmth retaining operation when the temperature of the upper container 14 sensed by the temperature sensor is decreased below 60° C., coffee is not heated by the heater 3 immediately after falling down into the lower container 13. Accordingly, coffee, the temperature of which is high immediately after the extracting operation, may be prevented from being heated to be re-boiled or the flavor of coffee may be prevented from being degraded owing to excessive heating. Further, since the heater 3 is still hot immediately after completion of the extracting operation, the remaining heat is applied to the lower container 13 containing coffee, thereby improving consumption of electrical power.

Although control of the electrical output supplied to the heater 3 during the warmth retaining operation is made by changing the energizing duty ratio in the above-described second embodiment, the heater output is controlled by way of phase control, instead.

The foregoing disclosure and drawings are merely illustrative of the principles of the present invention and are not to be interpreted in a limiting sense. The only limitation is to be determined from the scope of the appended claims.

What we claim is:
1. A siphon coffee maker comprising:
   (a) a lower container for containing water;
   (b) a heater for applying heat to the lower container;
   (c) an upper container disposed on the lower container, the upper container being provided with a water feed tube communicating to the interior of the lower container;
   (d) storage means for storing data of an amount of coffee to be extracted; and
   (e) control means for operating to energize the heater in response to an extracting operation command, thereby starting the extracting operation, the control means operating, after completion of the extracting operation, to supply the heater with an electrical output varied in proportion to the amount of coffee to be extracted, data of which is stored in the storage means, so that the heater is energized to execute a warmth retaining operation for the coffee extracted.

2. A siphon coffee maker as claimed in claim 1, which further comprises a volume selecting switch for selectively setting an amount of coffee to be extracted depending on the number of cups, and wherein data of the amount of coffee to be extracted set with the volume setting switch is stored in the storage means.

3. A siphon coffee maker as claimed in claim 1, which further comprises a timer starting timing a set period of time when the heater is deenergized, and wherein the control means operates to determine that the extracting operation has been completed when the timing operation of the timer is completed.

4. A siphon coffee maker as claimed in claim 3, which further comprises a volume selecting switch for selectively setting an amount of coffee to be extracted depending on the number of cups, and wherein the period of time set in the timer is varied in accordance with the number of cups set with the volume selecting switch.

5. A siphon coffee maker as claimed in claim 1, wherein the control means operates to change a heater output by intermittently energizing the heater during the warmth retaining operation and to change a heater energizing duty ratio in accordance with the amount of coffee to be extracted, data of which is stored in the storage means.

6. A siphon coffee maker as claimed in claim 1, which further comprises detecting means for detecting detachment of the lower container, and wherein the control means operates to supply the heater with the minimum electrical output when determining, during the warmth retaining operation, that the lower container has been detached, based on the result of detecting operation of the detecting means.

7. A siphon coffee maker comprising:
(a) a lower container for containing water;
(b) a heater for applying heat to the lower container;
(c) an upper container disposed on the lower container, the upper container being provided with a water feed tube communicating to the interior of the lower container;
(d) a temperature sensor disposed so as to be brought into contact with the upper container, thereby sensing the temperature of the upper container;
(e) temperature data storing means for storing data of the temperature of the upper container sensed by the temperature sensor; and
(f) control means for operating to energize the heater in response to an extracting operation command, thereby starting the extracting operation, the control means subsequently operating to deenergize the heater when the temperature of the upper container sensed by the temperature sensor reaches a predetermined value, thereby completing the extracting operation, the control means operating to supply the heater with input in inverse proportion to the temperature of the upper container sensed by the temperature sensor, data of which is stored in the storage means, after completion of the extracting operation, thereby executing a warmth retaining operation for coffee contained in the lower container.

8. A siphon coffee maker as claimed in claim 7, wherein the control means operates to change the heater output by intermittently energizing the heater during the warmth retaining operation and to change a heater energizing duty ratio in accordance with the temperature of the upper container sensed by the temperature sensor, data of which is stored in the temperature data storing means.

9. A siphon coffee maker as claimed in claim 7, wherein the control means operates to prevent the starting of the warmth retaining operation in the period during which the temperature of the upper container sensed by the temperature sensor is maintained at a predetermined value or above after completion of the extracting operation.

* * * * *